(12) United States Patent
Ito

(10) Patent No.: US 10,718,260 B2
(45) Date of Patent: Jul. 21, 2020

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi (JP)

(72) Inventor: Hirokazu Ito, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/251,296

(22) Filed: Jan. 18, 2019

(65) Prior Publication Data

US 2019/0249596 A1 Aug. 15, 2019

(30) Foreign Application Priority Data

Feb. 9, 2018 (JP) .................................. 2018-022245

(51) Int. Cl.
*F02B 37/18* (2006.01)
*F02D 41/00* (2006.01)
(Continued)

(52) U.S. Cl.
CPC ............ *F02B 37/18* (2013.01); *F01N 3/2053* (2013.01); *F01N 3/2892* (2013.01); *F01N 5/04* (2013.01);
(Continued)

(58) Field of Classification Search
CPC ...... F02B 37/18; F01N 3/2006; F01N 3/2892; F01N 5/04; F01N 13/08; F01N 3/2053;
(Continued)

(56) References Cited

U.S. PATENT DOCUMENTS

| 8,720,421 B2 * | 5/2014 | Niwa ..................... F02B 37/013 123/562 |
| 2005/0000497 A1 * | 1/2005 | Nakai ................... F02B 31/085 123/568.12 |

(Continued)

FOREIGN PATENT DOCUMENTS

| JP | 2010-180781 | 8/2010 |
| JP | 2012-193719 | 10/2012 |

*Primary Examiner* — Hoang M Nguyen
(74) *Attorney, Agent, or Firm* — Oblon, McClelland, Maier & Neustadt, L.L.P.

(57) ABSTRACT

In an exhaust gas purification apparatus for an internal combustion engine which is provided with a supercharger, an exhaust gas purification catalyst, a bypass passage, a wastegate valve, and a flow regulating member for changing a direction of flow of exhaust gas, the exhaust gas purification catalyst and the flow regulating member are arranged in such a manner that when warming up the exhaust gas purification catalyst, bypass exhaust gas goes toward an upstream side end face of the exhaust gas purification catalyst, whereas when the internal combustion engine is operated in a predetermined high load region, the bypass exhaust gas goes toward the flow regulating member. The flow regulating member includes a guide portion that guides the exhaust gas thus impinged in a circumferential direction of an exhaust pipe, and the guide portion is formed with a plurality of through holes.

4 Claims, 13 Drawing Sheets

(51) Int. Cl.
    *F01N 3/20* (2006.01)
    *F01N 3/28* (2006.01)
    *F01N 5/04* (2006.01)
    *F02D 41/02* (2006.01)
    *F01N 13/08* (2010.01)
    *F01N 13/10* (2010.01)
    *F01N 3/10* (2006.01)
    *F02D 41/06* (2006.01)

(52) U.S. Cl.
    CPC ......... *F01N 13/08* (2013.01); *F02D 41/0007* (2013.01); *F02D 41/024* (2013.01); *F01N 3/101* (2013.01); *F01N 13/107* (2013.01); *F01N 2240/20* (2013.01); *F01N 2260/06* (2013.01); *F01N 2260/14* (2013.01); *F01N 2260/20* (2013.01); *F01N 2340/06* (2013.01); *F01N 2470/02* (2013.01); *F01N 2470/24* (2013.01); *F02D 41/064* (2013.01); *F02D 2200/04* (2013.01)

(58) Field of Classification Search
    CPC ............. F01N 2470/02; F01N 2240/20; F01N 2470/24; F01N 3/101; F01N 2340/06; F01N 2260/20; F01N 2260/14; F01N 13/107; F01N 2260/06; F02D 41/024; F02D 41/0007; F02D 41/064; F02D 2200/04
    USPC .................................. 60/605.1–612
    See application file for complete search history.

(56) References Cited

U.S. PATENT DOCUMENTS

2012/0291431 A1* 11/2012 Bucknell ............... F01N 3/0835
                                                                 60/602
2012/0304640 A1* 12/2012 Tsuyuki .................. F02D 21/08
                                                                 60/605.2
2013/0097978 A1    4/2013 Nagasaka et al.

* cited by examiner

EXHAUST GAS PURIFICATION APPARATUS FOR AN INTERNAL COMBUSTION ENGINE

CROSS REFERENCE TO RELATED APPLICATIONS

This application claims priority to Japanese Patent Application No. 2018-022245 filed on Feb. 9, 2018 the entire contents of which are incorporated by reference herein.

TECHNICAL FIELD

The present disclosure relates to an exhaust gas purification apparatus for an internal combustion engine.

BACKGROUND ART

There has been known an internal combustion engine which has a supercharger, a bypass passage bypassing a turbine of the supercharger, and a wastegate valve (hereinafter, sometimes also referred to as a "WGV") arranged in the bypass passage. Then, there has also been known a technique of raising the temperature of an exhaust gas purification catalyst arranged at the downstream side of a merge portion between a bypass passage and an exhaust passage by using an exhaust gas of relatively high temperature having passed through the bypass passage, at the time of cold start of an internal combustion engine.

In patent literature 1, there is disclosed a technique in which at the time of cold start of an internal combustion engine, the degree of opening of a WGV is controlled so that an exhaust gas flowing out from a bypass passage into an exhaust passage (hereinafter, sometimes also referred to as a "bypass exhaust gas") impinges directly against an exhaust gas purification catalyst, whereas in a supercharging operation region, the degree of opening of the WGV is controlled so that the bypass exhaust gas does not impinge directly against the exhaust gas purification catalyst.

In addition, in patent literature 2, there is disclosed an exhaust gas purification apparatus in which louver members are arranged before and after the exhaust gas purification catalyst. In the exhaust gas purification apparatus, each of the louver members has a slit and a ramp, and it is constructed such that the direction of flow of an exhaust gas having passed through the slit can be changed by the ramp.

CITATION LIST

Patent Literature

Patent Literature 1: Japanese patent application laid-open publication No. 2010-180781
Patent Literature 2: Japanese patent application laid-open publication No. 2012-193719

SUMMARY OF THE INVENTION

Technical Problem

In an internal combustion engine having a supercharger, a bypass passage and a wastegate valve (WGV), when a required engine load to the internal combustion engine becomes higher, the degree of opening of the WGV is made smaller. In this case, when an exhaust gas purification apparatus of the internal combustion engine is constructed so that an exhaust gas (or bypass exhaust gas) flowing out from the bypass passage into an exhaust passage or pipe does not impinge directly against an exhaust gas purification catalyst (for example, refer to the patent literature 1), an excessive rise in the temperature of the exhaust gas purification catalyst can be suppressed. However, with the technique described in the patent literature 1, at this time, the bypass exhaust gas will impinge against a wall surface of the exhaust pipe, and the bypass exhaust gas flowing along the wall surface will flow into the exhaust gas purification catalyst. For that reason, it becomes difficult for the exhaust gas to flow into the exhaust gas purification catalyst in a uniform manner. In addition, when the degree of opening of the WGV is made smaller, the flow speed of the bypass exhaust gas tends to become faster, so the residence time of the exhaust gas in the exhaust gas purification catalyst easily becomes shorter. From these results, there is a fear that exhaust emissions may deteriorate.

Moreover, according to the technique described in the patent literature 2, the flow of the exhaust gas having passed through the slit is guided by the ramp, so it seems to become easy for the exhaust gas to flow into the exhaust gas purification catalyst in a uniform manner. However, in the exhaust gas purification apparatus described in the patent literature 2, the exhaust gas having passed through the slit of the louver member and guided by the ramp will flow into the exhaust gas purification catalyst, irrespective of the operating state of the internal combustion engine, in other words, similarly at the time of cold start of the internal combustion engine (at the time of warming up the exhaust gas purification catalyst), too. For that reason, when warming up the exhaust gas purification catalyst, the heat of the exhaust gas is taken by the louver member before the exhaust gas flows into the exhaust gas purification catalyst, so the period of time required to warm up the exhaust gas purification catalyst tends to become long. In that case, there is a fear that exhaust emissions and fuel economy may deteriorate.

Further, with the technique described in the patent literature 2, when the direction of flow of exhaust gas is changed by the ramp, pressure loss may occur. As a result, there is a fear that when warming up the exhaust gas purification catalyst, the start of warming up the exhaust gas purification catalyst may become slow, and hence, exhaust emissions may deteriorate. In addition, there is also a fear that in the supercharging operation region, when the flow of the exhaust gas is inhibited along with the above-mentioned pressure loss, the back pressure of the turbine may become high, and hence, the output of the internal combustion engine may decrease.

The present disclosure has been made in view of the above-mentioned problems, and has for its object to provide an exhaust gas purification apparatus in which at the time of cold start of an internal combustion engine, the temperature of an exhaust gas purification catalyst can be raised early, and when the internal combustion engine is operated in a predetermined high load region, exhaust emissions can be reduced as much as possible, while suppressing a decrease in the output of the internal combustion engine.

Solution to Problem

The present disclosure resides in an exhaust gas purification apparatus for an internal combustion engine which is provided with a supercharger, an exhaust gas purification catalyst, a bypass passage, a wastegate valve, and a flow regulating member for changing a direction of flow of exhaust gas, wherein the exhaust gas purification catalyst and the flow regulating member are arranged in such a manner that when warming up the exhaust gas purification catalyst, an exhaust gas (bypass exhaust gas) flowing out from the bypass passage into an exhaust passage or pipe goes to an upstream side end face of the exhaust gas purification catalyst. This makes it possible to raise the temperature of the exhaust gas purification catalyst early at the time of cold start of the internal combustion engine. Moreover, the exhaust gas purification catalyst and the flow regulating member are arranged in such a manner that when the internal combustion engine is operated in a predetermined high load region, the bypass exhaust gas goes toward the flow regulating member. The flow regulating member includes a guide portion to guide the exhaust gas thus impinged in a circumferential direction of the exhaust pipe, and the guide portion is formed with a plurality of through holes. With this, when the internal combustion engine is operated in the predetermined high load region, exhaust emissions can be decreased as much as possible, while suppressing a decrease in the output of the internal combustion engine.

Specifically, an exhaust gas purification apparatus for an internal combustion engine according to the present disclosure is provided with: a supercharger with a turbine arranged in an exhaust passage of the internal combustion engine; an exhaust gas purification catalyst that is arranged in the exhaust passage at a location downstream of the turbine; a bypass passage that branches from the exhaust passage at a location upstream of the turbine, and merges with the exhaust passage at a location upstream of the exhaust gas purification catalyst, while bypassing the turbine; a wastegate valve that is arranged in the bypass passage and adjusts a flow rate of exhaust gas flowing through the bypass passage, the wastegate valve configured to construct such that when a degree of opening thereof changes, a direction of flow of bypass exhaust gas, which is exhaust gas flowing out from the bypass passage into the exhaust passage, is changed; and a flow regulating member that is arranged in the exhaust passage between the turbine and the exhaust gas purification catalyst, and configured to change a direction of flow of exhaust gas in the exhaust passage. Then, the exhaust gas purification catalyst and the flow regulating member are arranged in such a manner that when warming up the exhaust gas purification catalyst, the bypass exhaust gas goes toward an upstream side end face of the exhaust gas purification catalyst, whereas when the internal combustion engine is operated in a predetermined high load region, the bypass exhaust gas goes toward the flow regulating member. Moreover, the flow regulating member includes a guide portion that guides the exhaust gas thus impinged in a circumferential direction of an exhaust pipe which defines the exhaust passage, and the guide portion is formed with a plurality of through holes.

According to such a construction, when warming up the exhaust gas purification catalyst, the bypass exhaust gas is directed to the upstream side end face of the exhaust gas purification catalyst. For that reason, it becomes easy for the bypass exhaust gas of relatively high temperature to flow directly into the exhaust gas purification catalyst, and so, the temperature of the exhaust gas purification catalyst can be raised at an early stage. As a result, exhaust emissions are decreased at the time of cold start of the internal combustion engine.

On the other hand, when the internal combustion engine is operated in the predetermined high load region, the bypass exhaust gas impinges against the flow regulating member. In that case, the impinged exhaust gas is guided in the circumferential direction of the exhaust pipe by the guide portion of the flow regulating member. Here, the predetermined high load region is a supercharging operation region of the internal combustion engine, and further is a region in which the wastegate valve is controlled to a degree of opening which is smaller than a fully opened state and larger than a fully closed state. Accordingly, at this time, the flow speed of the exhaust gas flowing out from the bypass passage becomes relatively fast. Then, when the flow speed of the exhaust gas flowing out from the bypass passage becomes fast, the directivity of the flow thereof becomes strong, thus making it difficult for the exhaust gas to flow into the exhaust gas purification catalyst in a uniform manner. In contrast to this, when the direction of flow of the bypass exhaust gas is changed by the flow regulating member as mentioned above, the bypass exhaust gas diffuses to some extent. As a result, it becomes easy for the exhaust gas to flow into the exhaust gas purification catalyst in a uniform manner. In this case, the range of circulation of the exhaust gas in the exhaust gas purification catalyst becomes wide, so that harmful components in the exhaust gas become easy to be removed. With this, it becomes possible to decrease exhaust emissions as much as possible.

In addition, when the bypass exhaust gas impinges against the flow regulating member, the flow speed of the exhaust gas is decreased. In other words, the flow speed of the exhaust gas flowing into the exhaust gas purification catalyst is decreased. As a result of this, the residence time of the exhaust gas in the exhaust gas purification catalyst becomes longer in comparison with the case where the bypass exhaust gas does not impinge against the flow regulating member, thus making it possible to decrease exhaust emissions as much as possible.

Further, in the exhaust gas purification apparatus for an internal combustion engine according to the present disclosure, the guide portion is formed with the plurality of through holes. For that reason, a part of the bypass exhaust gas having reached the flow regulating member will flow into the exhaust gas purification catalyst, without impinging against the flow regulating member, or passing through these through holes in the course of flowing along the guide portion. In this case, interference of the flow regulating member to the bypass exhaust gas is decreased. Accordingly, pressure loss, which may be caused by the flow regulating member inhibiting the flow of the bypass exhaust gas, is decreased. As a result, a situation where the back pressure of the turbine becomes high is suppressed, and hence, a decrease in the output of the internal combustion engine can be suppressed.

As described above, the exhaust gas purification apparatus for an internal combustion engine according to the present disclosure makes it possible to achieve the early temperature rise of the exhaust gas purification catalyst at the time of cold start of the internal combustion engine. Further, when the internal combustion engine is operated in the predetermined high load region, exhaust emissions can be decreased as much as possible, while suppressing the decrease in the output of the internal combustion engine.

Moreover, in the exhaust gas purification apparatus for an internal combustion engine according to the present disclosure, the flow regulating member may have an outer peripheral side end portion that extends in the circumferential direction of the exhaust pipe and is arranged along an inner wall surface of the exhaust pipe, and an inner peripheral side end portion that extends in the circumferential direction of the exhaust pipe, and is arranged nearer to a center axis side than the inner wall surface of the exhaust pipe. With such a construction, the flow regulating member includes an opening arranged in the vicinity of a center axis of the exhaust pipe. Then, when warming up the exhaust gas purification catalyst, the bypass exhaust gas flows through the opening of the flow regulating member. In that case, when warming up the exhaust gas purification catalyst, it becomes easy for the bypass exhaust gas to flow directly into the exhaust gas purification catalyst in an appropriate manner. On the other hand, when the internal combustion engine is operated in the predetermined high load region, the exhaust gas having impinged against the flow regulating member is guided in the circumferential direction of the exhaust pipe by the guide portion, and thereafter it passes through the opening of the flow regulating member and flows into the exhaust gas purification catalyst. In addition, a part of the exhaust gas having reached the flow regulating member passes through the through holes, and thereafter flows in the vicinity of the inner wall surface of the exhaust pipe, and flows into the exhaust gas purification catalyst. As a result of this, it becomes easy for the exhaust gas to flow into the exhaust gas purification catalyst uniformly, thus making it possible to decrease exhaust emissions as much as possible.

Further, the flow regulating member may be arranged in such a manner that the inner peripheral side end portion is located at an upstream side in the direction of flow of exhaust gas with respect to the outer peripheral side end portion, or the inner peripheral side end portion is located at the same position in the direction of flow of exhaust gas with respect to the outer peripheral side end portion. According to such a construction, it becomes easy for the exhaust gas having impinged against the flow regulating member to be guided in the circumferential direction of the exhaust pipe. In that case, it becomes easy for the exhaust gas to flow into the exhaust gas purification catalyst more uniformly, thus making it possible to decrease exhaust emissions as much as possible.

In addition, in cases where the flow regulating member is arranged such that the inner peripheral side end portion is located at an upstream side in the direction of flow of exhaust gas with respect to the outer peripheral side end portion, the exhaust gas having impinged against the flow regulating member will flow from a downstream side to an upstream side along the guide portion. In other words, the direction of flow of the exhaust gas having impinged against the flow regulating member is changed to reverse direction by means of the guide portion. Moreover, in cases where the flow regulating member is arranged such that the inner peripheral side end portion is located at the same position in the direction of flow of exhaust gas with respect to the outer peripheral side end portion, the direction of flow of the exhaust gas having impinged against the flow regulating member is changed by 90 degrees by means of the guide portion. Thus, when the direction of flow of the exhaust gas having impinged against the flow regulating member is changed to a relatively large extent, the exhaust gas will slow down to a relatively large extent. As a result, the flow speed of the bypass exhaust gas flowing into the exhaust gas purification catalyst becomes easier to drop. This makes the residence time of the exhaust gas in the exhaust gas purification catalyst longer, thus making it possible to decrease exhaust emissions as much as possible.

In the exhaust gas purification apparatus for an internal combustion engine mentioned above, the flow regulating member may be welded to the inner wall surface of the exhaust pipe. Here, if a welded portion between the exhaust pipe and the flow regulating member is arranged in a position in which condensed water generated by condensation of vapor in the exhaust gas can stay, there will be a fear that the welded portion may corrode. Accordingly, the flow regulating member may be arranged such that the welded portion thereof is located in a position in which the condensed water does not stay. According to this, a situation can be prevented where the welded portion between the exhaust pipe and the flow regulating member corrodes.

Advantageous Effects of Invention

According to the present disclosure, at the time of cold start of an internal combustion engine, the temperature of an exhaust gas purification catalyst can be raised early, and when the internal combustion engine is operated in a predetermined high load region, exhaust emissions can be reduced as much as possible, while suppressing a decrease in the output of the internal combustion engine.

DESCRIPTION OF THE EMBODIMENTS

Hereinafter, modes (or embodiments) for carrying out the present disclosure will be described in detail by way of example with reference to the attached drawings. However, the dimensions, materials, shapes, relative arrangements and so on of component parts described in the embodiments are not intended to limit the scope of the present disclosure to these alone in particular as long as there are no specific statements.

First Embodiment

<Construction of Intake and Exhaust Systems of Internal Combustion Engine>

Figure 1:
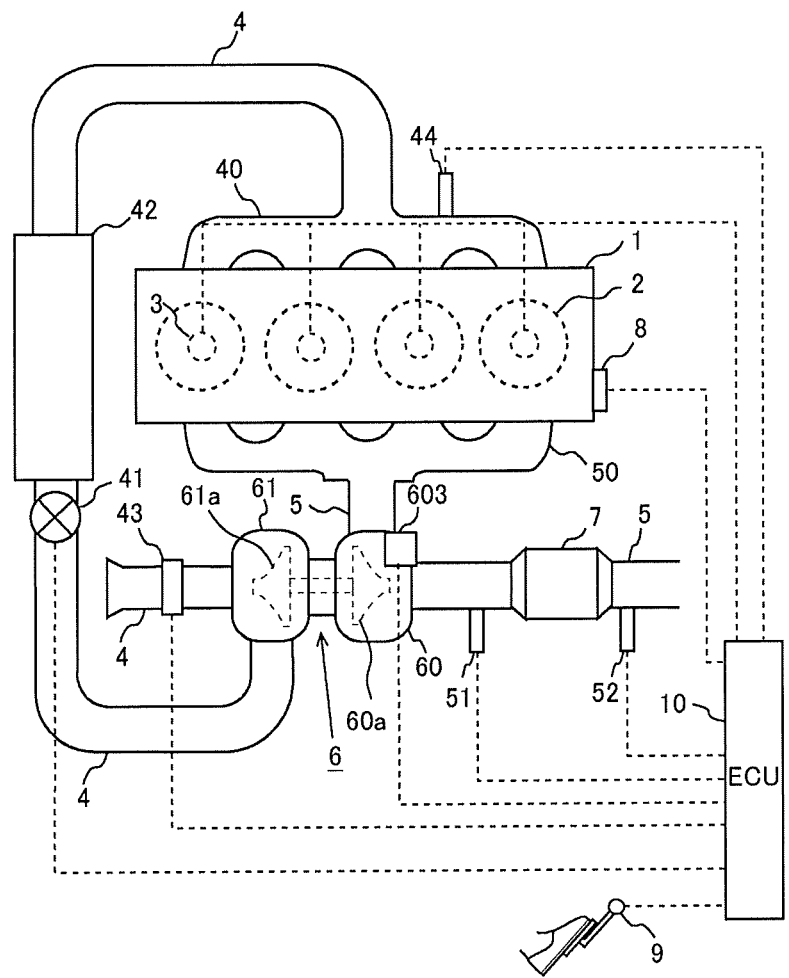
FIG. 1 is a view showing the schematic construction of an intake system and an exhaust system of an internal combustion engine according to a first embodiment of the present disclosure.

FIG. 1 is a view showing the schematic construction of an internal combustion engine and its intake and exhaust systems according to a first embodiment of the present disclosure. The internal combustion engine 1 shown in FIG. 1 is a spark ignition type internal combustion engine (gasoline engine) provided with a cylinder group including four cylinders 2. However, the present disclosure can also be applied to a compression ignition type internal combustion engine (diesel engine). On the internal combustion engine 1, there are mounted fuel injection valves 3 for injecting fuel into individual cylinders 2, respectively. Here, note that the fuel injection valves 3 may be constructed in such a manner as to directly inject fuel into individual intake ports. In addition, on the individual cylinders 2, there are mounted unillustrated spark plugs for igniting air fuel mixtures in the cylinders, respectively.

An intake manifold 40 and an exhaust manifold 50 are connected to the internal combustion engine 1. An intake passage 4 is connected to the intake manifold 40. In the middle of this intake passage 4, there is arranged a compressor housing 61 of a supercharger 6 that is driven to operate with the use of the energy of exhaust gas as a driving source. A compressor 61a is rotatably accommodated in the compressor housing 61.

An intercooler 42 for performing heat exchange between intake air and outside air is arranged in the intake passage 4 at a location downstream of the compressor housing 61. Then, a throttle valve 41 is arranged in the intake passage 4 between the compressor housing 61 and the intercooler 42. The throttle valve 41 serves to adjust an amount of intake air in the internal combustion engine 1 by changing the channel cross section of the intake passage 4. Also, an air flow meter 43 is mounted on the intake passage 4 at the upstream side of the compressor housing 61. The air flow meter 43 outputs an electrical signal corresponding to an amount (mass) of intake air (air) flowing in the intake passage 4. Further, an intake air pressure sensor 44 is mounted on the intake manifold 40. The intake air pressure sensor 44 outputs an electrical signal corresponding to the pressure of intake air (i.e., intake air pressure) in the intake manifold 40.

On the other hand, an exhaust passage 5 is connected to the exhaust manifold 50. In the middle of this exhaust passage 5, there is arranged a turbine housing 60 of the supercharger 6. A turbine 60a is rotatably accommodated in the turbine housing 60. Then, an exhaust gas purification catalyst 7 is arranged in the exhaust passage 5 at the downstream side of the turbine housing 60. The exhaust gas purification catalyst 7 is, for example, a three-way catalyst. In addition, an air fuel ratio sensor 51 is mounted on the exhaust passage 5 between the turbine housing 60 and the exhaust gas purification catalyst 7. The air fuel ratio sensor 51 detects an air fuel ratio of exhaust gas flowing into the exhaust gas purification catalyst 7. Moreover, a temperature sensor 52 is mounted on the exhaust passage 5 at the downstream side of the exhaust gas purification catalyst 7. The temperature sensor 52 detects the temperature of exhaust gas flowing out from the exhaust gas purification catalyst 7.

Figure 2A:
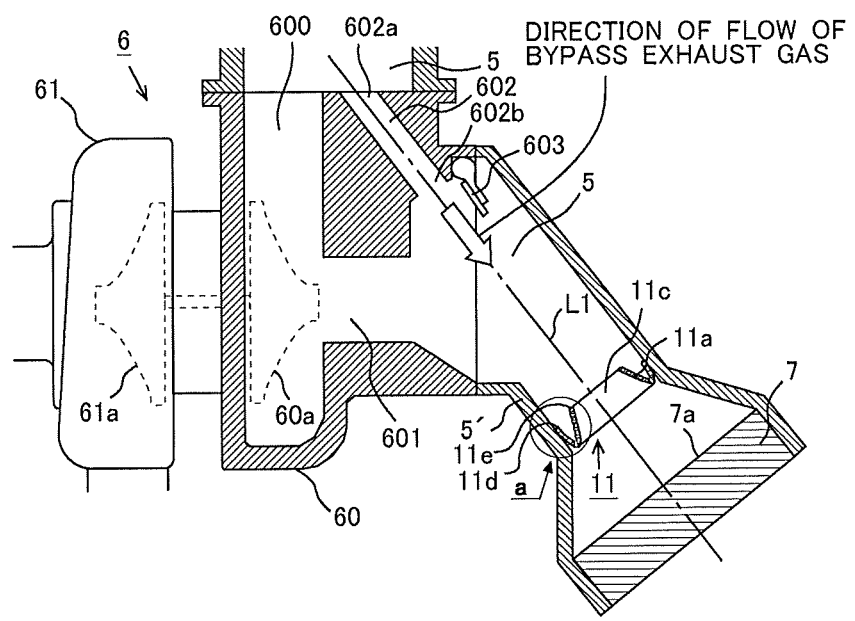
FIG. 2A is a view showing a cross section of a turbine housing according to the first embodiment of the present disclosure, and illustrating when a WGV is controlled to a substantially fully opened state.

Here, the turbine housing 60 is provided with a turbine inlet 600 for introducing the exhaust gas from the exhaust passage 5 to the turbine 60a, and a turbine outlet 601 for discharging the exhaust gas having passed through the turbine 60a to the exhaust gas purification catalyst 7, as shown in FIG. 2A. In addition, a bypass passage 602 for discharging the exhaust gas from the exhaust passage 5 to the exhaust gas purification catalyst 7 by bypassing the turbine inlet 600, the turbine 60a and the turbine outlet 601 is formed in the turbine housing 60. Here, when an inlet side portion in the bypass passage 602 is defined as a branch portion 602a branching from the exhaust passage 5, and an outlet side portion in the bypass passage 602 is defined as a merge portion 602b joining to the exhaust passage 5, the bypass passage 602 branches from the exhaust passage 5 at a branch portion 602a upstream of the turbine 60a, and merges with the exhaust passage 5 at a merge portion 602b upstream of the exhaust gas purification catalyst 7, while bypassing the turbine 60a. Then, the bypass passage 602 is arranged in such a manner that an extension line of an axis of the bypass passage 602 (i.e., an alternate long and short dash line L1 in FIG. 2A) intersects an upstream side end face 7a of the exhaust gas purification catalyst 7 (hereinafter, referred to as an "upstream side catalyst end face 7a"). In this embodiment, the axis of the bypass passage 602, an axis of an exhaust pipe (indicated as an exhaust pipe 5' in FIG. 2A) forming a part of the exhaust passage 5 between the turbine housing 60 and the exhaust gas purification catalyst 7 and an axis of the exhaust gas purification catalyst 7 (specifically, an axis of a cylindrical carrier by which the exhaust gas purification catalyst 7 is supported) are constructed so as to substantially align or coincide with one another.

Figure 2B:
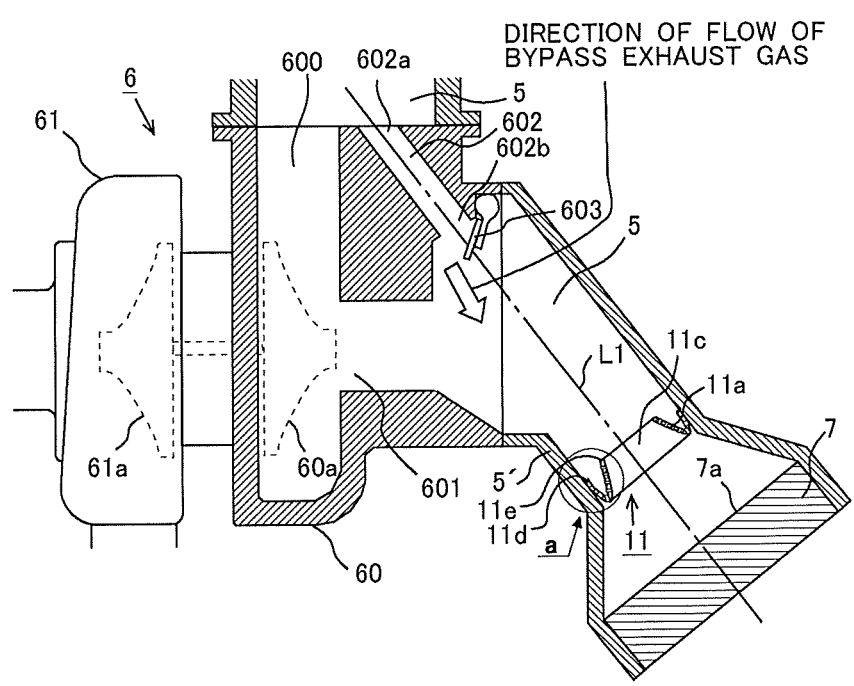
FIG. 2B is a view showing another cross section of the turbine housing according to the first embodiment of the present disclosure, and illustrating when the WGV is controlled to a closed side with respect to the substantially fully opened state.

In addition, the turbine housing 60 is provided with a waste gate valve 603 (hereinafter, sometimes also referred to as a "WGV 603") which is mounted at the outlet side of the bypass passage 602, and which adjusts the flow rate of exhaust gas flowing through the bypass passage 602 by changing a channel cross sectional area of the bypass passage 602. This WGV 603 is controlled by an ECU 10 which will be described later. Here, FIG. 2A illustrates when the WGV 603 is controlled to a substantially fully opened state, wherein the direction of flow of exhaust gas flowing out from the bypass passage 602 into the exhaust passage 5 (hereinafter, sometimes also referred to as "bypass exhaust gas") substantially aligns or coincides with the line L1. In other words, the bypass passage 602 directs the direction of flow of the bypass exhaust gas to the upstream side catalyst end face 7a, in a state where the WGV 603 is in the substantially fully opened state. On the other hand, FIG. 2B illustrates when the WGV 603 is controlled to a closed side with respect to the substantially fully opened state, wherein the direction of flow of the bypass exhaust gas directs to the side of the turbine outlet 601 as compared with when the WGV 603 is controlled to the substantially fully opened state. In this manner, the WGV 603 is constructed such that when the degree of opening thereof changes, the direction of flow of the bypass exhaust gas changes.

Here, reverting to FIG. 1, the electronic control unit (ECU) 10 is provided in combination with the internal combustion engine 1. This ECU 10 is a unit that controls the operating state of the internal combustion engine 1, etc. A variety of kinds of sensors such as a crank position sensor 8, an accelerator opening sensor 9, etc., in addition to the air flow meter 43, the intake pressure sensor 44, the air fuel ratio sensor 51, and the temperature sensor 52, are electrically connected to the ECU 10. The crank position sensor 8 is a sensor which outputs an electrical signal correlated with a rotational position of an engine output shaft (crankshaft) of the internal combustion engine 1. The accelerator opening sensor 9 is a sensor which outputs an electrical signal correlated with an amount of operation (accelerator opening) of an accelerator pedal. Then, the output signals of these sensors are inputted to the ECU 10. The ECU 10 derives an engine rotational speed of the internal combustion engine 1 based on the output signal of the crank position sensor 8, and also derives an engine load of the internal combustion engine 1 based on the output signal of the accelerator opening sensor 9. In addition, the ECU 10 estimates a flow rate of the exhaust gas discharged from the internal combustion engine 1 based on the output value of the air flow meter 43, and also estimates the temperature of the exhaust gas purification catalyst 7 based on the output value of the temperature sensor 52.

Moreover, a variety of kinds of devices such as the fuel injection valves 3, the throttle valve 41, the WGV 603, etc., are electrically connected to the ECU 10. Thus, these variety of kinds of devices are controlled by the ECU 10. For example, the ECU 10 can adjust the flow rate of the exhaust gas flowing through the bypass passage 602, by controlling the degree of opening of the WGV 603 (hereinafter, sometimes referred to as the "WGV opening degree"). In addition, when the ECU 10 controls the WGV opening degree, the direction of flow of the bypass exhaust gas changes.

Then, when warming up the exhaust gas purification catalyst 7, the ECU 10 can raise the temperature of the exhaust gas purification catalyst 7 early, by controlling the WGV 603 to the substantially fully opened state. This will be explained below. The exhaust gas discharged from the internal combustion engine 1 is divided in the branch portion 602a to flow into a passage at the side of the turbine 60a and the bypass passage 602. Then, the divided exhaust gases having passed through these passages merge with each other in the merge portion 602b, and flow into the exhaust gas purification catalyst 7. At this time, the exhaust gas passing through the passage at the side of the turbine 60a has a tendency that the heat thereof is easily taken by the turbine 60a with a large heat capacity, and so the temperature thereof becomes lower. On the other hand, the exhaust gas having passed through the bypass passage 602 has a tendency that the temperature thereof becomes relatively high. Here, as mentioned above, the bypass passage 602 directs the direction of flow of the bypass exhaust gas to the upstream side catalyst end face 7a, in the state where the WGV 603 is in the substantially fully opened state. Accordingly, when the ECU 10 controls the WGV 603 to the substantially fully opened state, it becomes easy for the bypass exhaust gas of relatively high temperature to flow directly into the exhaust gas purification catalyst 7, without impinging against the wall surface of the exhaust passage 5, thus making it possible to raise the temperature of the exhaust gas purification catalyst can be raised at an early stage.

<Flow Regulation of the Bypass Exhaust Gas>

A flow regulating member 11 is arranged in the exhaust passage 5 between the turbine housing 60 and the exhaust gas purification catalyst 7. Then, in the exhaust gas purification apparatus for an internal combustion engine according to this embodiment, the exhaust gas purification catalyst 7 and the flow regulating member 11 are arranged in such a manner that when warming up the exhaust gas purification catalyst 7, the bypass exhaust gas goes toward the upstream side catalyst end face 7a, whereas when the internal combustion engine 1 is operated in a predetermined high load region, the bypass exhaust gas goes toward the flow regulating member 11. This will be explained below based on FIG. 2A, FIG. 2B and FIG. 3.

Figure 3:
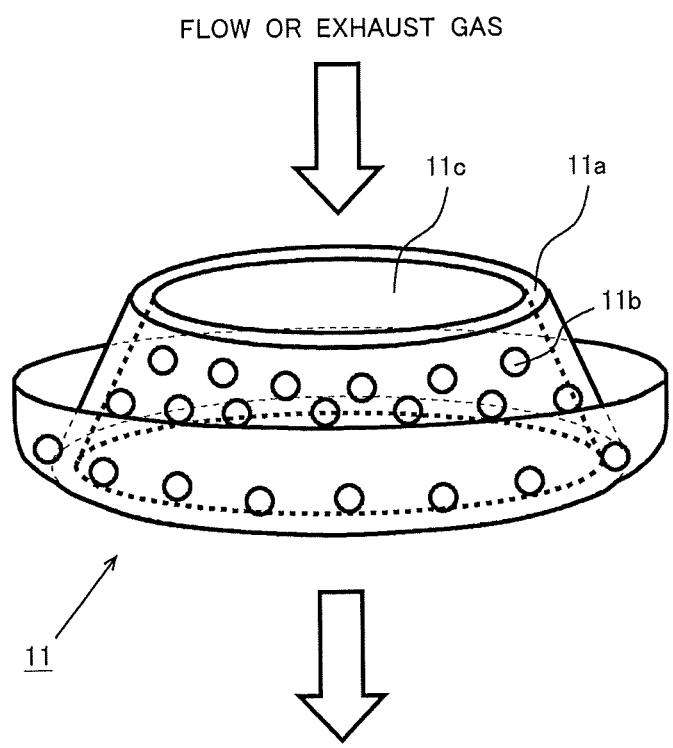
FIG. 3 is a first view showing the shape of a flow regulating member and the schematic construction thereof.

FIG. 3 is a view showing the shape of the flow regulating member 11 and the schematic construction thereof. As shown in FIG. 3, the flow regulating member 11 is formed into a truncated cone with the use of a sheet metal which spreads from an upstream side toward a downstream side in the direction of flow of exhaust gas. Moreover, the flow regulating member 11 has its one end turned up from the downstream side toward the upstream side. Then, such a flow regulating member 11 has a guide portion 11a, through holes 11b and an opening portion 11c. The guide portion 11a is formed of a sheet metal having a shape as mentioned above, and serves to change the direction of flow of the exhaust gas having impinged against the guide portion 11a, as will be described later. The through holes 11b are a plurality of holes which extend through the sheet metal from its front surface to its back surface. However, the through holes 11b may not be the holes, but may be any shapes as long as they extend through the sheet metal from its front surface to its back surface. The opening portion 11c is a portion which is open, extending continuously from a top face to a bottom face in the above-mentioned truncated cone shape. Here, note that in this embodiment, the flow regulating member 11 is formed of a sheet metal, but there is no intention of limiting the flow regulating member 11 to only this. For example, the flow regulating member 11 may be formed by cutting a metal material in the form of a round bar into the above-mentioned shape. In addition, in cases where the flow regulating member 11 is formed of the sheet metal, the flow regulating member 11 can be made of the same or like material as the exhaust pipe forming the exhaust passage 5.

Then, in this embodiment, as shown in FIG. 2A, the flow regulating member 11 has an outer peripheral side end portion 11d and an inner peripheral side end portion 11e arranged in the exhaust passage 5 between the turbine housing 60 and the exhaust gas purification catalyst 7, wherein the outer peripheral side end portion 11d is arranged along an inner wall surface of the exhaust pipe 5', and the inner peripheral side end portion 11e is arranged nearer to a center axis side than the inner wall surface of the exhaust pipe 5'. Further, in this case, the line L1 and the axis of the flow regulating member 11 are substantially in alignment or coincidence with each other, and the flow regulating member 11 is opened around the line L1. Here, at the time when the exhaust gas purification catalyst 7 is warmed up at which the WGV 603 is controlled to the substantially fully opened state, the direction of flow of the bypass exhaust gas substantially matches the line L1. Accordingly, the direction of flow of the bypass exhaust gas will be directed to the opening portion 11c of the flow regulating member 11. In other words, when warming up the exhaust gas purification catalyst 7, the flow regulating member 11 will be arranged in a position in which it does not intersect the direction of flow of the bypass exhaust gas.

According to such a construction, when warming up the exhaust gas purification catalyst 7, the bypass exhaust gas tends to pass through the opening portion 11c of the flow regulating member 11 and to flow into the exhaust gas purification catalyst 7. For that reason, it becomes easy for the bypass exhaust gas of relatively high temperature to flow directly into the exhaust gas purification catalyst 7, and so, the temperature of the exhaust gas purification catalyst 7 can be raised at an early stage. With this, when the internal combustion engine 1 is cold started, it becomes possible to decrease exhaust emissions as much as possible.

On the other hand, when the internal combustion engine 1 is operated in the predetermined high load region, the WGV 603 is controlled to the closed side with respect to the substantially fully opened state, as shown in FIG. 2B. Here, the predetermined high load region is a supercharging operation region of the internal combustion engine 1, and further is a region in which the WGV 603 is controlled to a degree of opening which is smaller than the fully opened state and larger than the fully closed state. At this time, as shown in FIG. 2B, the direction of flow of the bypass exhaust gas directs to the side of the turbine outlet 601 as compared with when the WGV 603 is controlled to the substantially fully opened state. In that case, the bypass exhaust gas will easily flow along the wall surface of the exhaust passage 5, as a result of which the bypass exhaust gas will impinge against the flow regulating member 11.

Next, reference will be made to a function of regulating the flow of the bypass exhaust gas by means of the flow regulating member 11. The guide portion 11a of the flow regulating member 11 is constructed so as to change the direction of flow of the exhaust gas which has impinged against the guide portion 11a. In addition, a part of the exhaust gas having reached the flow regulating member 11 passes through the through holes 11b, and then flows into the exhaust gas purification catalyst 7. As a result of this, exhaust emissions can be reduced as much as possible, while suppressing a decrease in the output of the internal combustion engine 1. This will be explained below in detail.

Figure 4:
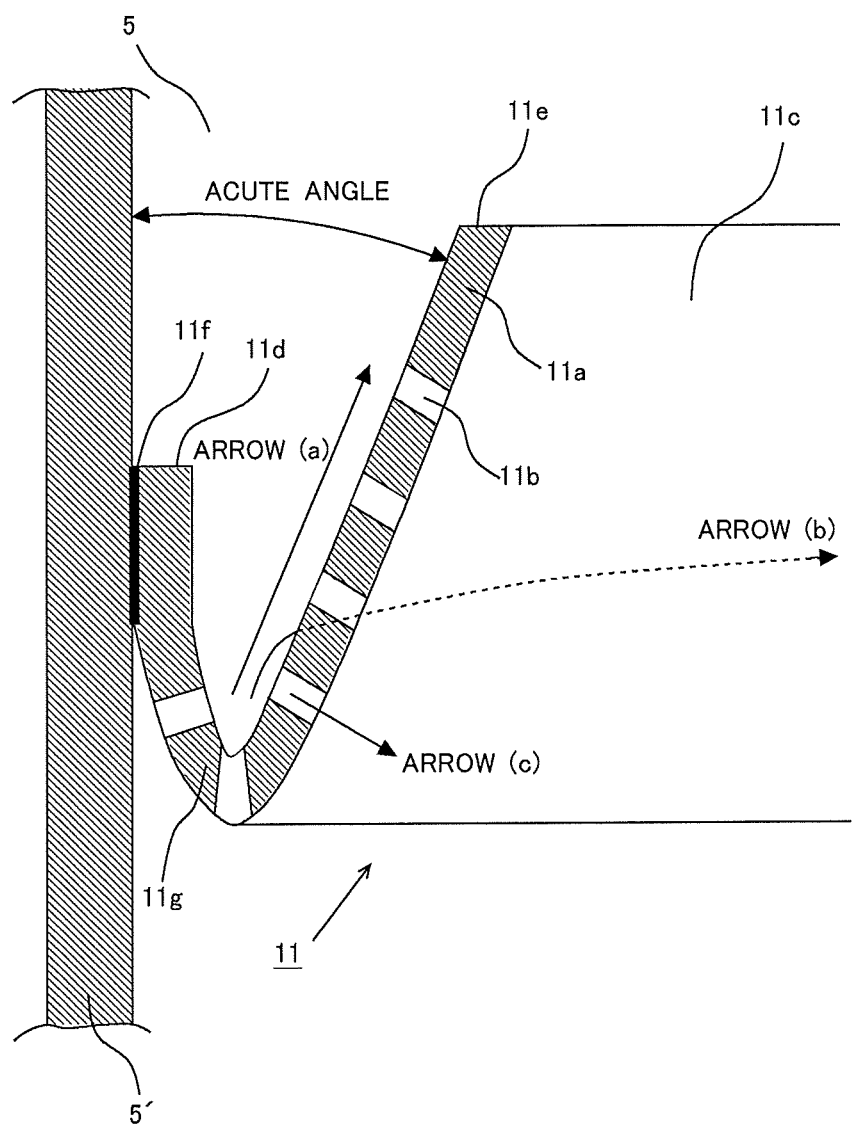
FIG. 4 is a view for explaining the flow of exhaust gas having reached the flow regulating member, and showing a region a in FIG. 2A and FIG. 2B on an enlarged scale.

FIG. 4 is a view for explaining the flow of the exhaust gas having reached the flow regulating member 11, and showing a region a in FIG. 2A and FIG. 2B on an enlarged scale. Here, note that the flow regulating member 11 is welded to the exhaust pipe 5' in a welded portion 11f which is formed at the side of the outer peripheral side end portion 11d, as shown in FIG. 4.

When the exhaust gas reaches the flow regulating member 11, the exhaust gas will impinge against the guide portion 11a, and the direction of flow thereof will be changed. Streams or flows of the exhaust gas at this time are indicated by arrow (a) and arrow (b), respectively, in FIG. 4. The arrow (a) shows a stream or flow of exhaust gas flowing along the guide portion 11a from a downstream side to an upstream side in the axial direction of the flow regulating member 11, and the arrow (b) shows a stream or flow of the exhaust gas flowing along the guide portion 11a in the circumferential direction of the flow regulating member 11 (the exhaust pipe 5'). In other words, the guide portion 11a guides the exhaust gas having impinged against the guide portion 11a so as to flow from the downstream side toward the upstream side, while spreading in the circumferential direction of the flow regulating member 11. Here, when that portion of the sheet metal of the flow regulating member 11 which is turned up as mentioned above is defined as a turned-up portion 11g, a surface extending from the turned-up portion 11g toward the inner peripheral side end portion 11e makes an acute angle with the inner wall surface of the exhaust pipe 5'. With this, a flow of exhaust gas going from the downstream side to the upstream side along the guide portion 11a is achieved.

Further, a part of the bypass exhaust gas having reached the flow regulating member 11 flows into the exhaust gas purification catalyst 7, without impinging against the flow regulating member 11, or passing through the through holes 11b in the course of flowing along the guide portion 11a (indicated by arrow (c) in FIG. 4).

When the flow of the bypass exhaust gas is regulated by the flow regulating member 11 as mentioned above, the bypass exhaust gas diffuses to some extent. In other words, the flow speed of the bypass exhaust gas flowing into the exhaust gas purification catalyst 7 is decreased. Also, it becomes easy for the bypass exhaust gas to flow into the exhaust gas purification catalyst 7 in a uniform manner. This will be explained below.

Figure 5:
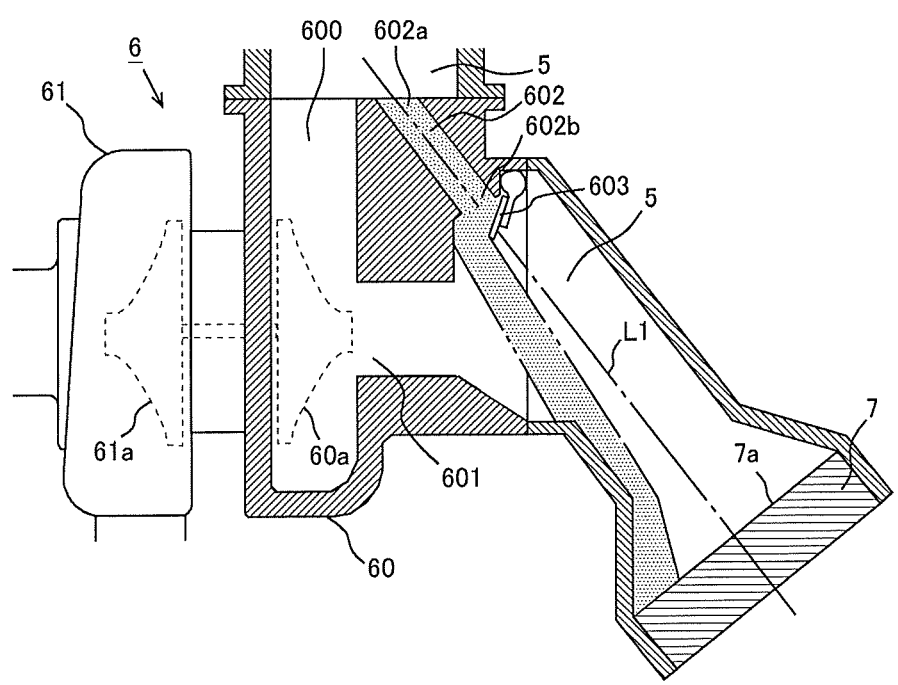
FIG. 5 is a view showing the flow of exhaust gas flowing into an exhaust gas purification catalyst, after passing through a bypass passage, when the internal combustion engine is operated in a predetermined high load region, in the case of assuming that the flow regulating member is not provided.

FIG. 5 is a view showing the flow of exhaust gas flowing into the exhaust gas purification catalyst 7, after passing through the bypass passage 602, when the internal combustion engine 1 is operated in the predetermined high load region, in the case of assuming that the flow regulating member 11 is not provided. In this case, the bypass exhaust gas will impinge against the wall surface of the exhaust passage 5, and the bypass exhaust gas flowing along the wall surface will flow into the exhaust gas purification catalyst 7. For that reason, it becomes difficult for the exhaust gas to flow into the exhaust gas purification catalyst 7 in a uniform manner, as shown in FIG. 5. In addition, when the WGV opening degree is made smaller, the flow speed of the bypass exhaust gas tends to become faster, so the residence time of the exhaust gas in the exhaust gas purification catalyst 7 easily becomes shorter. From these results, there is a fear that exhaust emissions may deteriorate.

Figure 6:
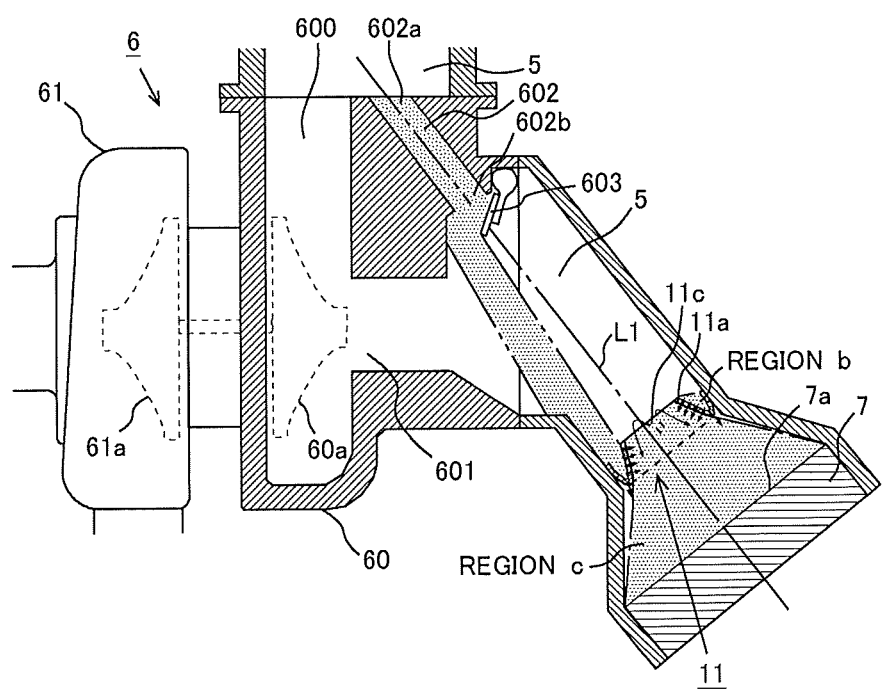
FIG. 6 is a view showing the flow of exhaust gas flowing into the exhaust gas purification catalyst, after passing through the bypass passage and impinging against the flow regulating member, when the internal combustion engine is operated in the predetermined high load region.

In contrast to this, when the above-mentioned flow regulating member 11 is arranged, as shown in FIG. 6, the exhaust gas having impinged against the guide portion 11a is spread or diffused in the circumferential direction of the flow regulating member 11 (indicated by a region b in FIG. 6). Then, the exhaust gas guided by the guide portion 11a passes through the opening portion 11c, and flows into the exhaust gas purification catalyst 7. In addition, a part of the exhaust gas having reached the flow regulating member 11 passes through the through holes 11b, and thereafter flows in the vicinity of the wall surface of the exhaust passage 5, and flows into the exhaust gas purification catalyst 7. In that case, the exhaust gas spreads or diffuses, as shown by a region c in FIG. 6.

In other words, when the internal combustion engine 1 is operated in the predetermined high load region, the flow speed of the exhaust gas flowing out from the bypass passage 602 becomes relatively fast, but the exhaust gas impinges against the flow regulating member 11, and the direction of flow thereof is changed, whereby the exhaust gas diffuses to decrease and the flow speed of the bypass exhaust gas flowing into the exhaust gas purification catalyst 7. As a result of this, the residence time of the exhaust gas in the exhaust gas purification catalyst 7 becomes longer in comparison with the case where the bypass exhaust gas does not impinge against the flow regulating member 11, thus making it possible to decrease exhaust emissions as much as possible.

In addition, when a comparison is made between FIG. 5 and FIG. 6, it is found that the flow regulating member 11 serves to cause the exhaust gas to flow into the exhaust gas purification catalyst 7 in a uniform manner. As a result, the range of circulation of the exhaust gas in the exhaust gas purification catalyst 7 becomes wide, so that harmful components in the exhaust gas become easy to be removed. Moreover, when a part of the exhaust gas having reached the flow regulating member 11 passes through the through holes 11*b*, interference of the flow regulating member 11 with the bypass exhaust gas is decreased. For that reason, pressure loss, which may be caused by the flow regulating member 11 inhibiting the flow of the bypass exhaust gas, is decreased. This serves to suppress the occurrence of a situation where the back pressure of the turbine 60*a* becomes high, as a result of which a decrease in the output of the internal combustion engine 1 can be suppressed.

As described above, the exhaust gas purification apparatus for an internal combustion engine according to this embodiment makes it possible to achieve the early temperature rise of the exhaust gas purification catalyst 7 at the time of cold start of the internal combustion engine 1. Further, when the internal combustion engine 1 is operated in the predetermined high load region, exhaust emissions can be decreased as much as possible, while suppressing the decrease in the output of the internal combustion engine 1.

Figure 7:
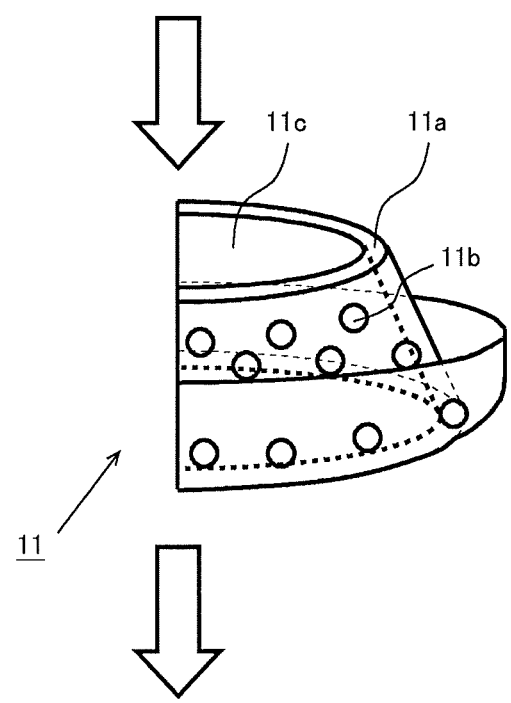
FIG. 7 is a second view showing the shape of the flow regulating member and the schematic construction thereof.

Here, note that the flow regulating member 11 according to this embodiment has the outer peripheral side end portion 11*d* arranged along the entire circumferential periphery of the inner wall surface of the exhaust pipe 5' so that the exhaust gas having impinged against the guide portion 11*a* can be spread or diffused widely in the circumferential direction thereof, but there is no intention to limit the flow regulating member 11 to this. For example, a flow regulating member 11 of a semicircular shape as shown in FIG. 7 may be arranged in a position where the bypass exhaust gas impinges thereagainst, when the internal combustion engine 1 is operated in the predetermined high load region.

Moreover, in the flow regulating member 11 according to this embodiment, as shown in the above-mentioned FIG. 4, the welded portion 11*f* is arranged at the upstream side of the turned-up portion 11*g*, and the through holes 11*b* are formed in the turned-up portion 11*g*, too, whereby a situation can be prevented where the welded portion between the exhaust pipe 5' and the flow regulating member 11 corrodes. This will be explained below based on FIG. 8.

Figure 8:
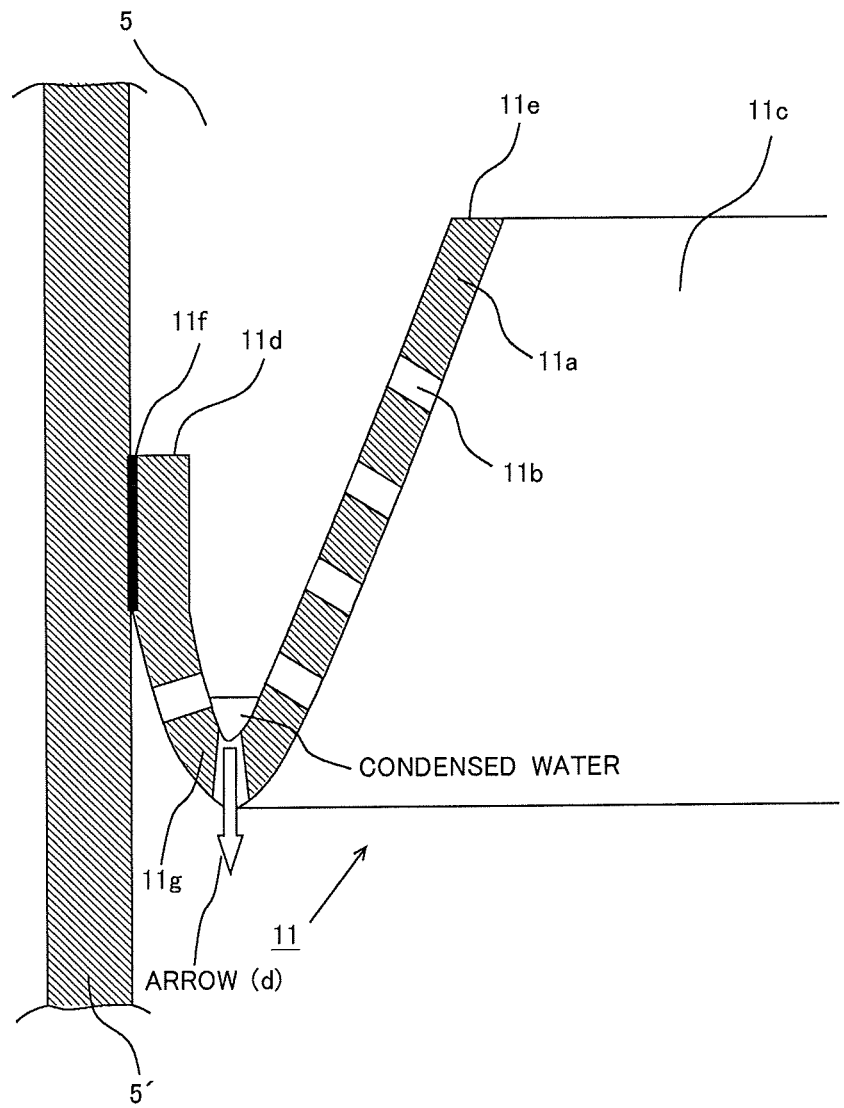
FIG. 8 is a first view for explaining a positional relationship between a welded portion and a condensed water staying portion, and showing the region a in FIG. 2A and FIG. 2B on an enlarged scale.

FIG. 8 is a view for explaining a positional relationship between the welded portion 11*f* and a condensed water staying portion, and showing the region a in FIG. 2A and FIG. 2B on an enlarged scale. Here, if the welded portion 11*f* is arranged in a position in which condensed water generated by condensation of vapor in the exhaust gas can stay, there will be a fear that the welded portion may corrode. Accordingly, in this embodiment, with the formation of the turned-up portion 11*g*, it is constructed so that the condensed water may easily stay in the turned-up portion 11*g*. Then, the through holes 11*b* are formed in the turned-up portion 11*g*, too, whereby the condensed water drops in the direction of gravity through the through holes 11*b*, as indicated by arrow (d) in FIG. 8. Moreover, the welded portion 11*f* is arranged at the upstream side of the turned-up portion 11*g*. For that reason, the condensed water does not stay in the welded portion 11*f*. As a result of this, a situation can be prevented where the welded portion between the exhaust pipe 5' and the flow regulating member 11 corrodes.

Figure 9:
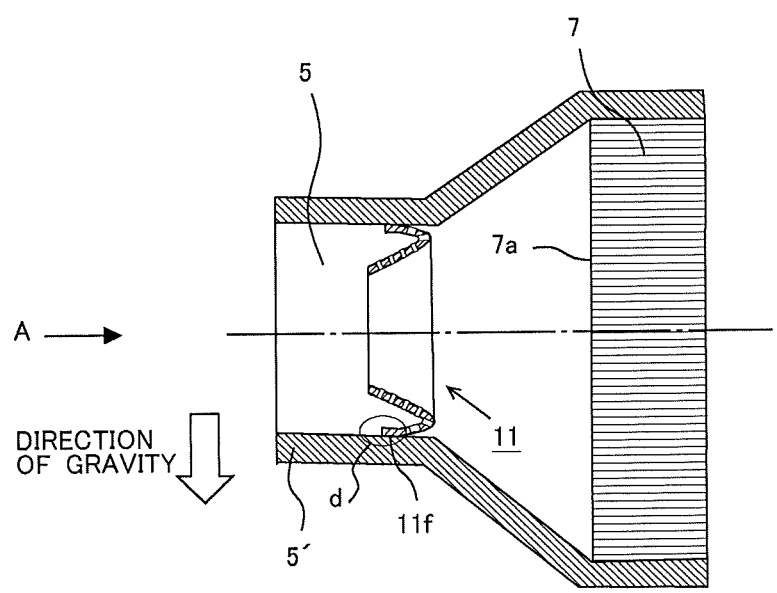
FIG. 9 is a second view for explaining the positional relationship between the welded portion and the condensed water staying portion.

However, in cases where the flow regulating member 11 is arranged so that the axis of the flow regulating member 11 becomes horizontal with respect to the direction of gravity, as shown in FIG. 9, there is a fear that the condensed water may stay in the welded portion 11*f* (such a situation may be caused in a region d in FIG. 9). Accordingly, in such a case, the welded portion 11*f* is not arranged in the direction of gravity. This will be explained below based on FIG. 10.

Figure 10:
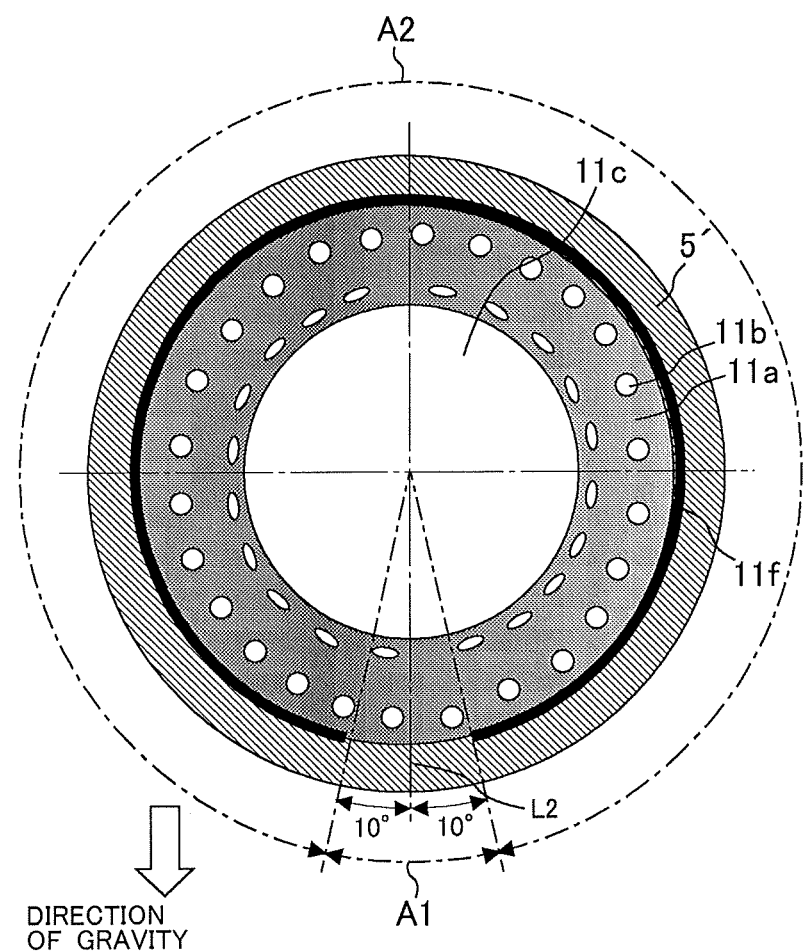
FIG. 10 is a view seen from arrow A in FIG. 9, for explaining the welded portion arranged in a position in which condensed water does not stay.

FIG. 10 is a view seen from arrow A in FIG. 9, for explaining the welded portion 11*f* arranged in a position in which the condensed water does not stay. The condensed water can stay in a range A1 in the circumferential direction of the exhaust pipe 5' shown in FIG. 10. Here, note that the range A1 is a range of ±10 degrees with respect to a center axis L2 in the direction of gravity of the exhaust pipe 5', for example. However, there is no intention to limit the range A1 to this, but the range A1 may be defined as a range wider than this, in consideration of a swirling flow of the exhaust gas after passing the turbine 60*a*, etc. Then, in this case, the welded portion 11*f* is not arranged in the range A1. In other words, the welded portion 11*f* is arranged in a range A2 except the range A1 in the circumferential direction of the exhaust pipe 5'. As a result of this, a situation can be prevented where the welded portion between the exhaust pipe 5' and the flow regulating member 11 corrodes.

Second Embodiment

Next, reference will be made to a second embodiment of the present disclosure based on FIGS. 11 and 12. Here, note that in this second embodiment, a detailed explanation of substantially the same construction and substantially the same control processing as in the above-mentioned first embodiment will be omitted.

Figure 11:
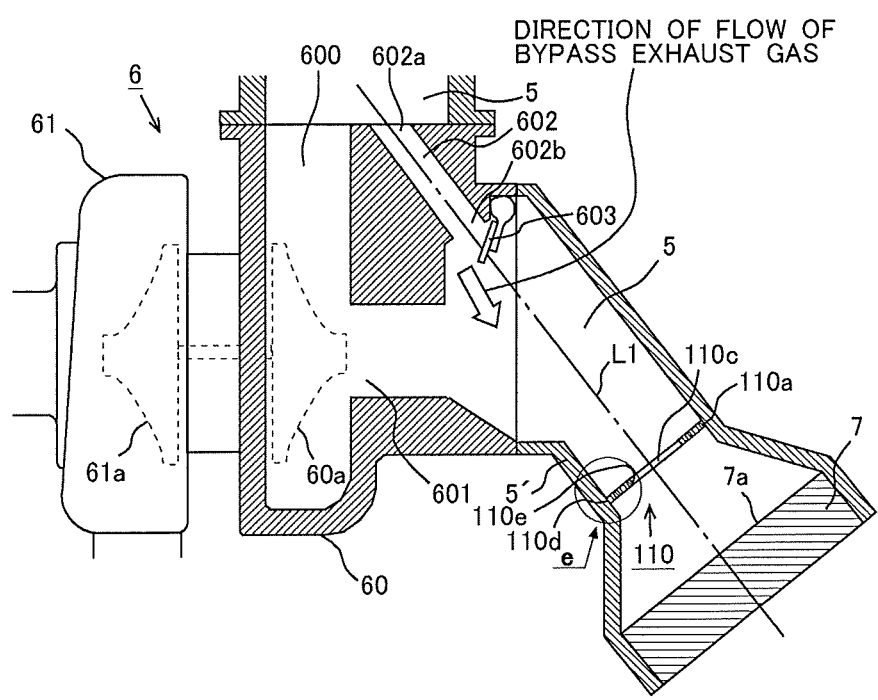
FIG. 11 is a view showing a cross section of a turbine housing according to a second embodiment of the present disclosure, and illustrating when a WGV is controlled to a closed side with respect to a substantially fully opened state.

FIG. 11 is a view showing a cross section of the turbine housing 60 according to the second embodiment of the present disclosure, and illustrating when the WGV 603 is controlled to the closed side with respect to the substantially fully opened state. In this embodiment, too, similar to the above-mentioned first embodiment, when the internal combustion engine 1 is operated in the predetermined high load region, bypass exhaust gas impinges against a flow regulating member 110. Here, the flow regulating member 110 according to this second embodiment has a flat plate shape, and includes, similar to the flow regulating member 11 described in the explanation of the first embodiment, a guide portion 110*a*, through holes 110*b*, an opening portion 110*c*, an outer peripheral side end portion 110*d*, an inner peripheral side end portion 110*e*, and a welded portion 110*f*. Here, note that when warming up the exhaust gas purification catalyst 7, the bypass exhaust gas tends to pass through the opening portion 110*c* of the flow regulating member 110 and to flow into the exhaust gas purification catalyst 7, as in the above-mentioned first embodiment.

Then, reference will be made to a function of regulating the flow of the bypass exhaust gas by means of such a flow regulating member 110. FIG. 12 is a view for explaining the flow of exhaust gas having reached the flow regulating member 110, and showing a region e in FIG. 11 on an enlarged scale. Here, note that the flow regulating member 110 is welded to the exhaust pipe 5' in the outer peripheral side end portion 110*d*, as shown in FIG. 12. That is, the outer peripheral side end portion 110*d* becomes the welded portion 110*f*.

When the exhaust gas reaches the flow regulating member 110, the exhaust gas will impinge against the guide portion 110*a*, and the direction of flow thereof will be changed. Streams or flows of the exhaust gas at this time are indicated by arrow (a') and arrow (b'), respectively, in FIG. 12. The arrow (a') shows a stream or flow of exhaust gas flowing along the guide portion 110*a* from the outer peripheral side end portion 110*d* to the inner peripheral side end portion 110*e* of the flow regulating member 110, and the arrow (b') shows a stream or flow of the exhaust gas flowing along the guide portion 110*a* in the circumferential direction of the flow regulating member 110. Here, the guide portion 110*a* makes an angle of 90 degrees with respect to an inner wall surface of the exhaust pipe 5'. With this, the direction of flow of the exhaust gas having impinged against the flow regulating member 110 is changed by 90 degrees by means of the guide portion 110a. Thus, when the direction of flow of the exhaust gas having impinged against the flow regulating member 110 is changed to a relatively large extent, the exhaust gas will slow down to a relatively large extent. As a result, the flow speed of the bypass exhaust gas flowing into the exhaust gas purification catalyst 7 becomes easy to drop. Also, it becomes easy for the bypass exhaust gas to flow into the exhaust gas purification catalyst 7 in a uniform manner. With this, it becomes possible to decrease exhaust emissions as much as possible.

Figure 12:
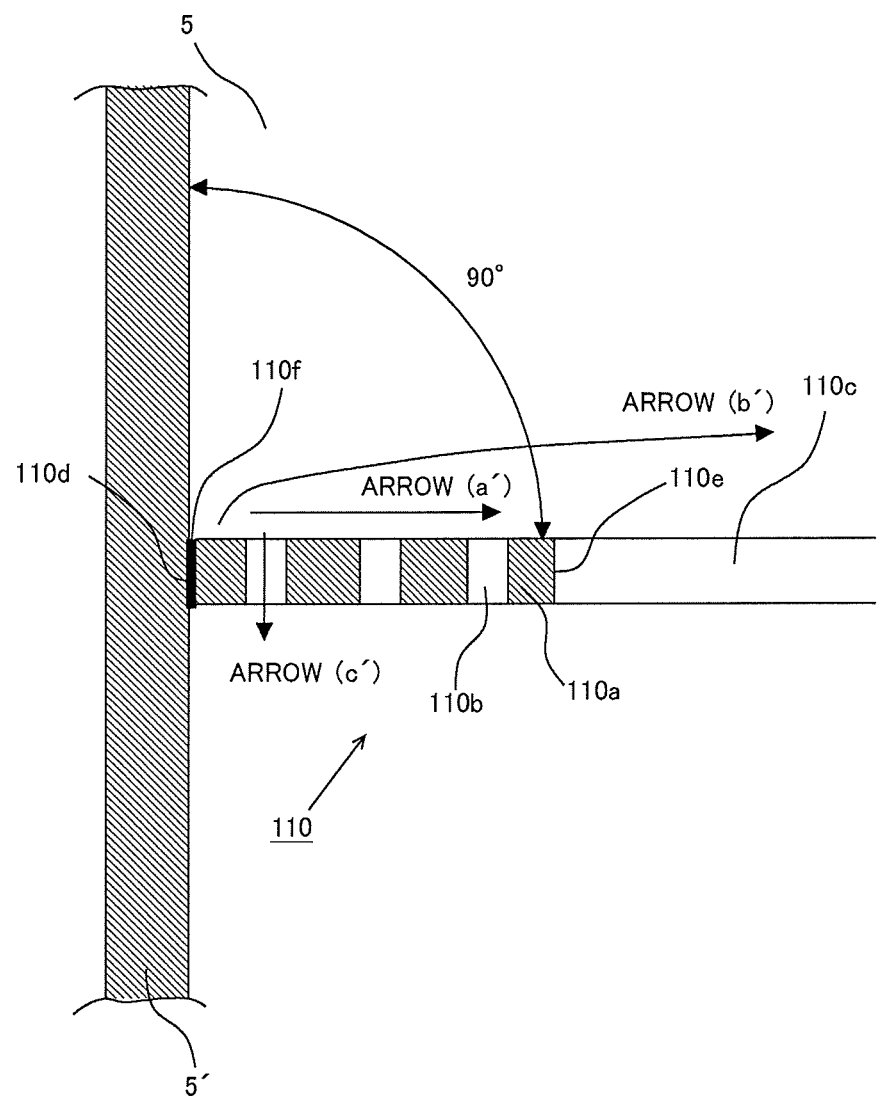
FIG. 12 is a view for explaining the flow of exhaust gas having reached a flow regulating member, and showing a region e in FIG. 11 on an enlarged scale.

Further, a part of the bypass exhaust gas having reached the flow regulating member 110 flows into the exhaust gas purification catalyst 7, without impinging against the flow regulating member 110, or passing through the through holes 110b in the course of flowing along the guide portion 110a (indicated by arrow (c') in FIG. 12). In that case, it becomes easy for the exhaust gas to flow into the exhaust gas purification catalyst 7 in a uniform manner, while reducing pressure loss which may be caused by the flow regulating member 110 inhibiting the flow of the bypass exhaust gas.

Here, note that the condensed water adhered to the flow regulating member 110 can move along with the flow of the exhaust gas which flows from the outer peripheral side end portion 110d to the inner peripheral side end portion 110e along the guide portion 110a. For that reason, the condensed water does not stay in the welded portion 11f, and hence, a situation can be prevented where the welded portion between the exhaust pipe 5' and the flow regulating member 110 corrodes.

As described above, the exhaust gas purification apparatus provided with the above-mentioned flow regulating member 110 makes it possible to achieve the early temperature rise of the exhaust gas purification catalyst 7 at the time of cold start of the internal combustion engine 1. Further, when the internal combustion engine 1 is operated in the predetermined high load region, exhaust emissions can be decreased as much as possible, while suppressing a decrease in the output of the internal combustion engine 1.

The invention claimed is:

1. An exhaust gas purification apparatus for an internal combustion engine comprising:
   a supercharger with a turbine arranged in an exhaust passage of the internal combustion engine;
   an exhaust gas purification catalyst that is arranged in the exhaust passage at a location downstream of the turbine;
   a bypass passage that branches from the exhaust passage at a location upstream of the turbine, and merges with the exhaust passage at a location upstream of the exhaust gas purification catalyst, while bypassing the turbine;
   a wastegate valve that is arranged in the bypass passage and adjusts a flow rate of exhaust gas flowing through the bypass passage, the wastegate valve configured to construct such that when a degree of opening thereof changes, a direction of flow of bypass exhaust gas, which is exhaust gas flowing out from the bypass passage into the exhaust passage, is changed; and
   a flow regulating member that is arranged in the exhaust passage between the turbine and the exhaust gas purification catalyst, and configured to change a direction of flow of exhaust gas in the exhaust passage;
   wherein the exhaust gas purification catalyst and the flow regulating member are arranged in such a manner that when warming up the exhaust gas purification catalyst, the bypass exhaust gas goes toward an upstream side end face of the exhaust gas purification catalyst, whereas when the internal combustion engine is operated in a predetermined high load region, the bypass exhaust gas goes toward the flow regulating member;
   the flow regulating member includes a guide portion that guides the exhaust gas thus impinged in a circumferential direction of an exhaust pipe which defines the exhaust passage; and
   the guide portion is formed with a plurality of through holes.

2. The exhaust gas purification apparatus for an internal combustion engine as set forth in claim 1, wherein
   the flow regulating member includes:
   an outer peripheral side end portion that extends in the circumferential direction of the exhaust pipe and is arranged along an inner wall surface of the exhaust pipe; and
   an inner peripheral side end portion that extends in the circumferential direction of the exhaust pipe, and is arranged nearer to a center axis side than the inner wall surface of the exhaust pipe.

3. The exhaust gas purification apparatus for an internal combustion engine as set forth in claim 2, wherein
   the flow regulating member is arranged in such a manner that the inner peripheral side end portion is located at an upstream side in the direction of flow of exhaust gas with respect to the outer peripheral side end portion, or the inner peripheral side end portion is located at the same position in the direction of flow of exhaust gas with respect to the outer peripheral side end portion.

4. The exhaust gas purification apparatus for an internal combustion engine as set forth in claim 1, wherein
   the flow regulating member is welded to an inner wall surface of the exhaust pipe in a welded portion, and the welded portion is arranged in a position in which condensed water does not stay.

* * * * *